May 12, 1925.
W. LUGE
LAND, MUD, AND WATER MOTOR CAR
Filed Sept. 8, 1924
1,537,319
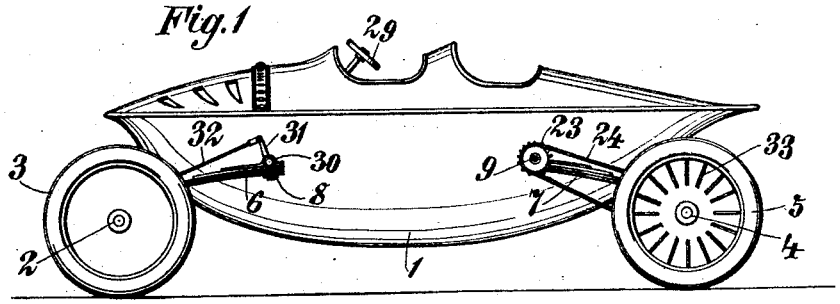
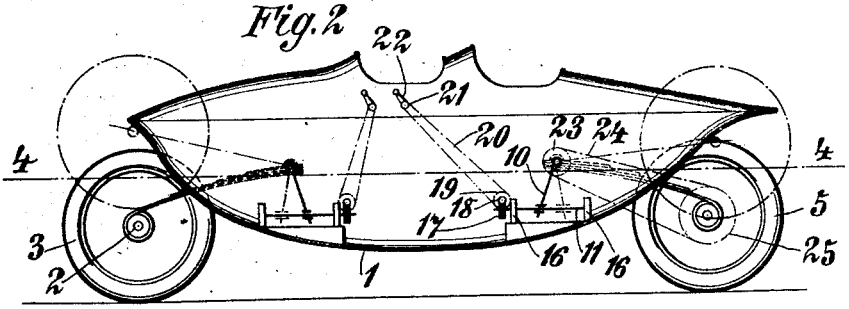
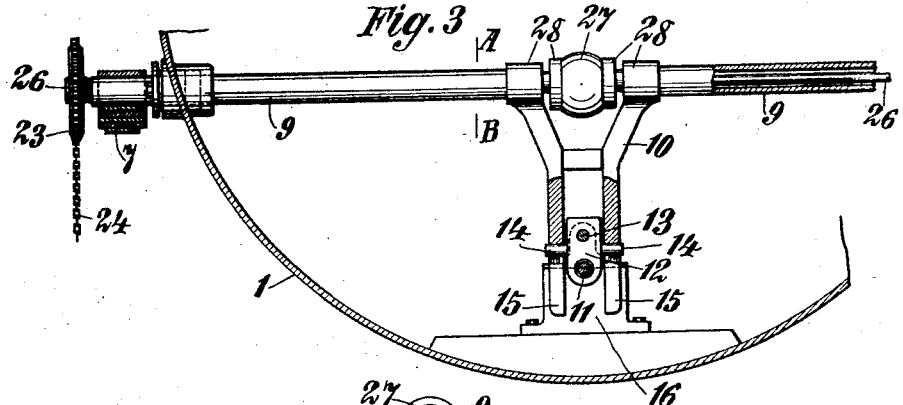
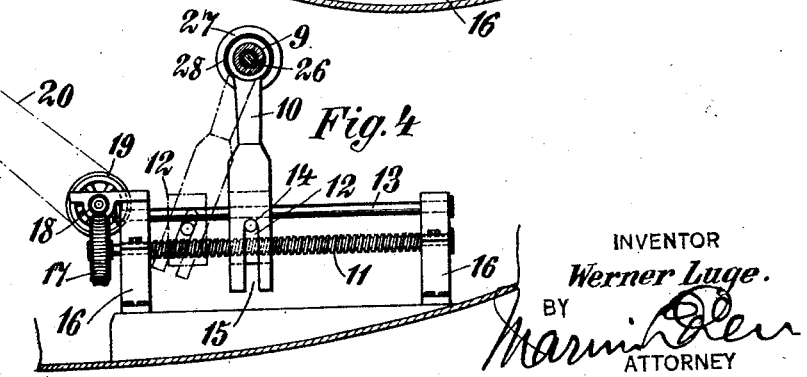
INVENTOR
*Werner Luge.*
BY
ATTORNEY Patented May 12, 1925.

1,537,319

UNITED STATES PATENT OFFICE.

WERNER LUGE, OF BROOKLYN, NEW YORK.

LAND, MUD, AND WATER MOTOR CAR.

Application filed September 8, 1924. Serial No. 736,520.

*To all whom it may concern:*

Be it known that I, WERNER LUGE, a citizen of Argentina, residing at Brooklyn, in the county of Kings and State of New York, have invented certain new and useful Improvements in Land, Mud, and Water Motor Cars, of which the following is a specification.

The present invention relates to improvements in motor vehicles and particularly to vehicles adapted to be as equally well used on land, in water or swampy and muddy ground, and it is the principal object of the invention to provide the front and rear axles of a vehicle with adjustable springs secured to the chassis and adapted to be operated from the seat of the driver independently from each other in order to prevent an immersion of the car axles into the water or swamp, and allow a sliding or gliding motion of the boat-shaped body through the water or on the swampy or muddy ground.

Another object of the invention is the provision of a vehicle of this type which, on land, has the appearance of the customary sport models or racing models, while in the water it runs almost as good as a boat.

These and other objects and advantages of my invention will become more fully known as the description proceeds, and will then be specifically pointed out in the appended claim.

In the accompanying drawing, forming a material part of this disclosure:—

Figure 1 is a side elevation of a motor vehicle constructed in accordance with the present invention.

Figure 2 is a longitudinal section through the vehicle.

Figure 3 illustrates the rear axle construction.

Figure 4 is a section on line A—B of Figure 3.

The chassis 1 has the form of a boat and is equipped with a front axle 2, carrying the front wheels 3, and a rear axle 4 carrying the wheels 5, which are attached to the chassis by means of the movable springs 6 and 7. The springs 6 and 7 are keyed to divided hollow shafts 8 and 9 which can be turned from the interior of the chassis.

The device for the operation of the divided shafts 8 and 9 can be constructed alike for front and rear axles. In Figure 3 a device for the adjustment of the rear axle is illustrated. As shown, the two parts of the hollow shaft 9 are firmly connected in the median plane of the chassis by means of a lever 10, adapted to be displaced in the direction of the longitudinal axis of the chassis by means of a spindle 11. A spindle block 12 is guided along a rod 13 and its lateral tenons 14 enter slots 15 in lever 10.

The spindle 11 and guide rod 13 are journalled in brackets 16 of the chassis. The operation of the spindle 11 is effected by means of a worm gear 17 engaging a worm 18 which can be operated from the driver's seat by the intermediary chain and sprocket wheel system 19, 20 and 21 by means of a crank 22. By this construction it is possible to raise or lower the front and rear axles by the operation of the respective cranks. The system is self-locking, the spindle and worm drive allowing no movement, if not operated by the crank, so that the axles will be secured in any of their adjusted positions.

The operation of the rear wheels is effected by a sprocket and chain system 23, 24 and 25. The sprocket wheels 23 are carried by shafts 26 which are extended through the hollow shaft 9 and are coupled in the well known manner by a differential gear system 27.

At both sides of the differential gear, brake drums 28 are provided. The steering of the vehicle is effected in the customary manner. The operation of the steering wheel 29 is transmitted to a shaft 30 by means of a gear system or the like, and the shaft 30 extends through the hollow shaft 8. Levers 31 are attached to the ends of the shaft 30 which engage the operating rods 32 for the adjustment of the wheels.

The shafts 8 and 9 and the shafts 26 and 30 are guided through stuffing boxes in order to prevent the entrance of water into the body.

In operation, if the vehicle is guided from land into water, the operator, by proper operation of the cranks 22 from his seat, raises the front and rear axles so high that the wheels 3 of the front axle just enter the water far enough to enable a proper steering, while the rear wheels remain below the water level to about their half diameter.

It will thereafter be possible to use the rear wheels as propelling means for the vehicle in the water. In order to increase their driving capacity within the water, they may be constructed as disc wheels and at their outer faces they may be provided with paddles or fins 33, which also may be enlarged by the operation of rotatable segments, etc.

In case the vehicle enters a swamp or muddy ground in which it sinks to its axles, the operator winds up the front and rear axles. The front wheels are allowed to enter the mud or swamp to a depth enabling a steering while the rear wheels are immersed into the mire just far enough to propel the car by means of their fins; the lower part of the body slides on the upper level of the morass and prevents in this manner a deeper immersion.

When the vehicle emerges from a body of water or swamp, and is to be propelled on firm ground, the axles are swung below the vehicle until they touch the ground and elevate the chassis, the vehicle will then easily and readily climb in low speed any slope leading to a road and firm ground.

Changes may be made in the construction of my device and in the arrangement of the parts or minor details thereof without departing from the spirit of my invention as defined in the appended claim.

Having thus described my invention, what I claim as new and desire to secure by Letters Patent, is:—

A motor car for use on land and water, swamps or mud comprising a boat-shaped body, axles, rear and front wheels on said axles, means for allowing an independent elevation of said front and rear axles and wheels from the seat of the driver, and paddles connected with the rear wheels for allowing propulsion of the vehicle through the water and an immersion of the front wheels to enable a proper steering.

In witness whereof I have affixed my signature.

WERNER LUGE.